May 8, 1928.
J. KINDERVATER
ARTICULATED STAYBOLT
Filed June 10, 1926
1,669,253
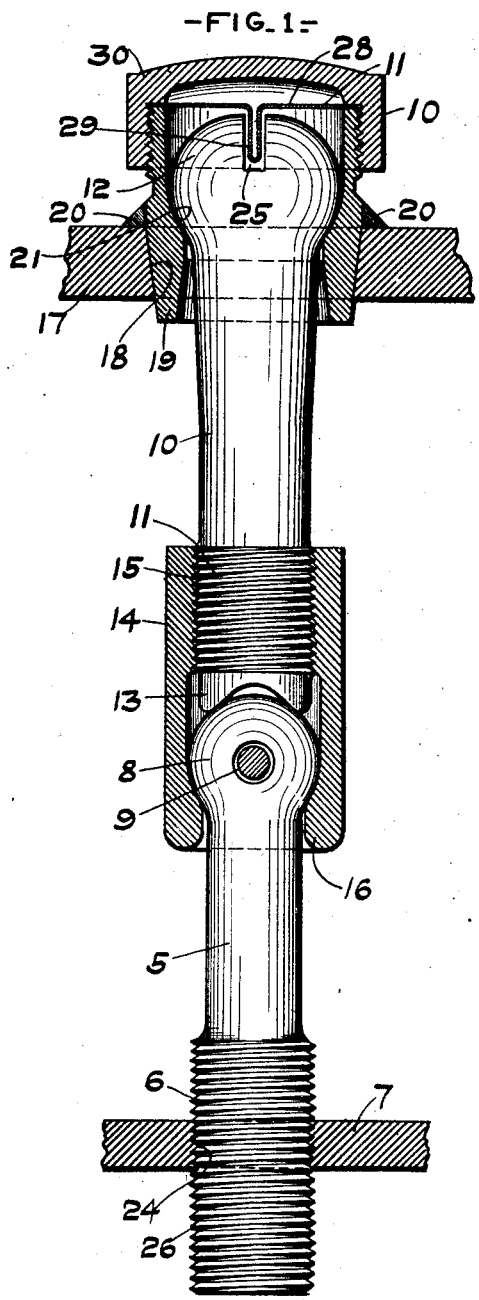
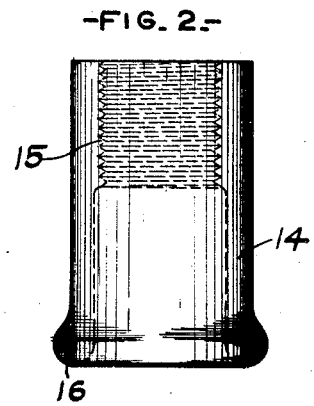
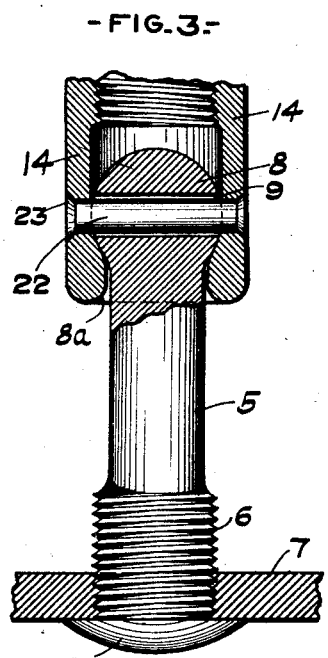
INVENTOR
Julius Kindervater
BY
Clarence Kerr
ATTORNEY Patented May 8, 1928.

1,669,253

UNITED STATES PATENT OFFICE.

JULIUS KINDERVATER, OF RICHMOND, VIRGINIA.

ARTICULATED STAY BOLT.

Application filed June 10, 1926. Serial No. 115,030.

My invention relates to boiler staybolts of the articulated, flexible type and has for its object the construction of a staybolt of this character which can be economically manufactured and easily assembled and applied. With this and other objects in view, the invention comprises a bolt consisting of two sections connected by means of a sleeve member which has threaded engagement with one section and a ball and socket joint connection with the other section. The outer end of the outer section is formed for universal movement in a sleeve member seated in the boiler shell. To assist in the assembly and mounting of the parts in a boiler, the outer end of the outer section is provided with a transverse slot formed to receive a tool which not only can be used to turn or rotate the parts to produce thereby a screw threaded relation of the lower end of the lower section with the fire box wall, but also provides means for preventing rotation of the bolt structure after assembly.

In the accompanying drawing: Figure 1 is a view, in vertical section, of an articulated staybolt embodying the invention; Fig. 2, a view, in side elevation, of a connecting sleeve member showing its formation before being assembled into the staybolt; and, Fig. 3, a view, in vertical section, of the lower end of the staybolt, taken at a right angle to Fig. 1.

The improvement claimed is hereinafter fully set forth:

In the practice of my invention, referring descriptively to the specific embodiment thereof which is herein exemplified, the staybolt is provided at its inner end with a threaded section 6 adapted to have engagement with an opening provided for the purpose in the fire box wall 7. The upper end of the stud member 5 has a ball-shaped head 8 and is provided with a passage 9 extending transversely therethrough.

The staybolt structure also includes an outer section 10 which has a threaded section 11 at its lower end and a rounded or spherical upper extremity 12. The extreme lower end of the bolt section 10 is provided with projecting members 13 which form a concavely curved seat in which to receive the rounded outer end of the ball-shaped terminal member 8 of the lower stud or bolt section 5.

A sleeve member 14 is interiorly threaded at 15 in its upper portion for threaded engagement with the threaded section 11 of the lower end of the bolt section 10. The lower end of the sleeve 14 is turned inwardly as at 16 to engage beneath the ball-shaped terminal portion 8 of the bolt section 5 and provide a socket therefor.

The boiler shell 17 is provided with a tapered opening 18 in which a sleeve member 19 is fastened either through a welding operation as indicated at 20 or by other suitable means. The sleeve member 19 is provided with a seat 21 to receive the rounded surface of the ball-shaped member 12 and provide limited universal movement of the member 12 in contact with the sleeve member 19.

The sleeve member 14, in addition to having a ball and socket joint connection with the upper end 8 of the bolt section 5, is also provided with a hinged connection thereto which is provided by a pin 22 which has passed through the opening 9 in the ball member 8 and attached at its ends in the wall of the sleeve member 14, the end portions of the pin 22 having a countersunk construction 23 which leaves them flush with the external surface of the sleeve member 14. The opening 9 through which the pin 22 extends is preferably larger in diameter than the diameter of the pin to provide a slight clearance which enables the parts to have a limited amount of relative rotative movement with relation to each other and about their longitudinal axes.

In mounting the described structure in a boiler, the upper bolt section 10 is threaded into position in the sleeve member 14, after the outer end 8 of the bolt section 5 has been inserted into the sleeve 14 and the inner end 16 of the sleeve has been upset to form a socket for the ball 8, whereupon the joined bolt sections are inserted through the opening 18 in the boiler shell 17 to bring the lower end of the threaded section 6 of the bolt section 5 into register with the opening 24 in the fire box wall 7. A suitable tool is then applied to a transversely extending slot 25 formed in the upper end of the upper bolt section 10 and the bolt section 10 is rotated to produce thereby rotative movement in the inner bolt section 5 and cause the bolt section 5 to move into position in the threaded opening 24 in the fire box wall 7. When the bolt structure has been threaded into the fire box wall 7 a sufficient distance to bring the ball-shaped terminal 12 of the upper section 10 into engagement with its seat 21 in the sleeve 19, an anvil member is held against the upper end of the bolt section 10 and the lower protruding end 26 of the lower bolt section 5 is riveted or upset to form a head 27, such as is shown in Fig. 3 of the drawings.

In order to prevent rotation of the bolt section 10 after installation, a diaphragm member 28 having a rib 29 formed in a central portion thereof is clamped at its ends between a cap member 30 and the outer end of the sleeve member 19, the rib portion 29 being loosely inserted into the transverse slot 25 in the head of the bolt sections to prevent substantial rotation of the bolt after assembly. The diaphragm 28 also limits the formation of scale about the outer end of the bolt section 10.

In Fig. 2 is shown a sleeve member 14 prior to the upsetting or inturning of the lower end 16 thereof to form the socket for the ball-shaped terminal 8 of the bolt section 5, as is shown in Figs. 1 and 3 of the drawings. It will be seen that when the terminal portion 16 of the sleeve 14 is inturned to its socket forming position, the exterior surface of the sleeve member 14 is of the same diameter from end to end, thus permitting its introduction through the opening 18 formed in the boiler wall 17.

A feature of the invention resides in the ease with which the staybolt structure described can be placed in position. The removal of portions of the staybolt structure from the boiler can also be easily accomplished so that the structure is easily assembled. It is, therefore, economical to use, is easily manufactured, and is capable of being salvaged in practically all its parts when circumstances so require.

The invention claimed, and desired to be secured by Letters Patent is:

1. In a boiler staybolt structure, a bolt section attached at its inner end to the fire box wall and having a ball-shaped outer end, a bolt section having a ball and socket connection at its outer end with the boiler shell, a sleeve member having a threaded connection at its outer end with the inner end of the upper bolt section, said sleeve member being provided with a socket formation in which to receive said ball-shaped outer end of the inner bolt section, and a pin extending transversely through the walls of the socket and the ball-shaped end of the inner bolt section.

2. In a flexible boiler staybolt, the combination of an inner bolt section having a spherical head at its outer end, and a screw thread at its inner end; an outer bolt section having a spherical head at its outer end, formed with a groove for the reception of a turning tool, and a screw thread at its inner end; an outer sleeve, adapted to fit within an opening in a boiler shell sheet, said outer sleeve having an internal spherical seat upon which the spherical head of the outer bolt section bears; an inner sleeve having, at its lower end, an internal spherical seat on which the spherical end of the inner bolt section bears, and an internal screw thread, at its outer end, engaging the screw thread on the inner end of the outer bolt sections; and means for causing the inner bolt section to rotate axially with the inner sleeve.

3. In a flexible boiler staybolt, the combination of an inner bolt section having a spherical head at its outer end, and a screw thread at its inner end; an outer bolt section having a spherical head at its outer end, formed with a groove for the reception of a turning tool, and a screw thread at its inner end; an outer sleeve, adapted to fit within an opening in a boiler shell sheet, said outer sleeve having an internal spherical seat upon which the spherical head of the outer bolt section bears; an inner sleeve having, at its lower end, an internal spherical seat on which the spherical end of the inner bolt section bears, and an internal screw thread at its outer end, engaging the screw thread on the inner end of the outer bolt section; means for causing the inner bolt section to rotate axially with the inner sleeve; and detachable means, fitted in the groove in the outer end of the outer bolt section, and non-rotatably attached to the outer sleeve, whereby the outer section of the bolt is locked against rotation axially of the outer sleeve.

JULIUS KINDERVATER.